(12) United States Patent
Uchida

(10) Patent No.: US 7,415,441 B1
(45) Date of Patent: Aug. 19, 2008

(54) PRINTING SYSTEM, APPARATUS AND METHOD FOR AUTOMATICALLY PRINTING RECORDS OF ELECTRONIC TRANSACTIONS

(75) Inventor: Yuki Uchida, Wayne, NJ (US)

(73) Assignees: Ricoh Company, Ltd., Tokyo (JP); Ricoh Corporation, West Caldwell, NJ (US)

(*) Notice: Subject to any disclaimer, the term of this patent is extended or adjusted under 35 U.S.C. 154(b) by 581 days.

(21) Appl. No.: 09/815,134

(22) Filed: Mar. 22, 2001

(51) Int. Cl.
*H04K 1/00* (2006.01)

(52) U.S. Cl. .................. 705/64; 705/1; 705/62; 340/3.1; 340/3.3; 340/3.63; 702/182

(58) Field of Classification Search ............ 705/24, 705/1, 62, 64; 340/3.1; 702/182
See application file for complete search history.

(56) References Cited

U.S. PATENT DOCUMENTS

| | | | |
|---|---|---|---|
| 4,396,985 A * | 8/1983 | Ohara | 705/15 |
| 4,688,026 A * | 8/1987 | Scribner et al. | 235/385 |
| 4,932,485 A * | 6/1990 | Mori | 177/25.15 |
| 5,382,784 A * | 1/1995 | Eberhardt | 235/462.46 |
| 5,396,417 A * | 3/1995 | Burks et al. | 705/17 |
| 5,489,773 A * | 2/1996 | Kumar | 235/380 |
| 5,548,110 A * | 8/1996 | Storch et al. | 235/462.07 |
| 5,590,197 A * | 12/1996 | Chen et al. | 705/65 |
| 5,595,356 A * | 1/1997 | Kewin | 242/613.5 |
| 5,640,002 A * | 6/1997 | Ruppert et al. | 235/462.46 |
| 5,739,512 A * | 4/1998 | Tognazzini | 235/380 |
| 5,892,824 A * | 4/1999 | Beatson et al. | 713/186 |
| 5,971,273 A * | 10/1999 | Vallaire | 235/381 |
| 5,978,774 A * | 11/1999 | Rogers et al. | 705/24 |
| 6,016,504 A * | 1/2000 | Arnold et al. | 709/200 |
| 6,018,713 A * | 1/2000 | Coli et al. | 705/2 |
| 6,067,529 A * | 5/2000 | Ray et al. | 705/26 |
| 6,115,690 A * | 9/2000 | Wong | 705/7 |
| 6,154,738 A * | 11/2000 | Call | 707/4 |
| 6,164,528 A * | 12/2000 | Hills et al. | 235/379 |
| 6,198,985 B1 * | 3/2001 | Miyasaka et al. | 700/213 |
| 6,232,876 B1 * | 5/2001 | Maloney | 340/568.1 |
| 6,327,576 B1 * | 12/2001 | Ogasawara | 705/22 |
| 6,341,353 B1 * | 1/2002 | Herman et al. | 713/201 |
| 6,343,157 B1 | 1/2002 | Yada | |

(Continued)

FOREIGN PATENT DOCUMENTS

JP  7-230494  8/1995

(Continued)

OTHER PUBLICATIONS

White, Ron, How Computers Work, Millennium Ed. Que Corporation, Sep. 1999.*

(Continued)

*Primary Examiner*—Bradley Bayat
(74) *Attorney, Agent, or Firm*—Cooper & Dunham, LLP

(57) ABSTRACT

A method and system for automatically printing a hard copy of transaction information relating to a transaction conducted electronically between a user-side and a supplier side. A control apparatus performs an operation of identifying a selected aspect of information regarding the electronic transaction to thereby generate a print apparatus which is sent to a printing apparatus which prints transaction information in response to said print request. In addition, a printer for use with the method and system is provided.

16 Claims, 7 Drawing Sheets

U.S. PATENT DOCUMENTS

| | | | |
|---|---|---|---|
| 6,357,662 B1 * | 3/2002 | Helton et al. | 235/462.45 |
| 6,415,978 B1 * | 7/2002 | McAllister | 235/462.01 |
| 6,456,207 B1 * | 9/2002 | Yen | 340/994 |
| 6,526,033 B1 * | 2/2003 | Wang et al. | 370/338 |
| 6,533,168 B1 * | 3/2003 | Ching | 235/375 |
| 6,543,683 B2 * | 4/2003 | Hoffman | 235/375 |
| 6,557,758 B1 * | 5/2003 | Monico | 235/380 |
| 6,578,013 B1 * | 6/2003 | Davis et al. | 705/26 |
| 6,681,246 B1 * | 1/2004 | Dutta | 709/206 |
| 6,721,783 B1 * | 4/2004 | Blossman et al. | 709/206 |
| 6,738,749 B1 * | 5/2004 | Chasko | 705/17 |
| 6,744,862 B2 * | 6/2004 | Kobylevsky et al. | 379/88.16 |
| 6,758,403 B1 * | 7/2004 | Keys et al. | 235/462.45 |
| 6,763,996 B2 * | 7/2004 | Rakers et al. | 235/375 |
| 6,975,423 B2 * | 12/2005 | Koakutsu et al. | 358/1.16 |
| 6,986,030 B2 * | 1/2006 | Shmueli et al. | 713/1 |
| 7,082,406 B1 * | 7/2006 | Dickson | 705/24 |

FOREIGN PATENT DOCUMENTS

JP      11-196184      7/1999

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Borland's Paradox for Windows User's Guide, Borland International, Inc, 1994.*

Borland's ReportSmith for Windows User's Guide, Borland International, Inc, 1994.*

Muller, Nathan J., Desktop Encyclopedia of the Internet, Artech House, Inc., 1998.*

Sokol, Phyllis K., EDI, the Competitive Edge, Multiscience Press, Inc., 1989.*

Bragg, Steven M., Accounting Best Practices, John Wiley and Sons, Inc., 1999.*

Chopra, Sunil, and Meindl, Peter; Supply Chain Management, Strategy, Planning, & Operation, Prentice-Hall, Inc., Oct. 10, 2000.*

Dec. 4, 2007 Japanese official action in connection with corresponding Japanese application No. 2002-059406.

* cited by examiner

PRINTING SYSTEM, APPARATUS AND METHOD FOR AUTOMATICALLY PRINTING RECORDS OF ELECTRONIC TRANSACTIONS

FIELD

This patent specification relates to a method and system for automatically printing information relating to electronic transactions between a user side and a supplier side based on identification of a selected aspect of information regarding the electronic transaction, and to a printing apparatus for automatically printing a hard copy of transaction information relating to a transaction conducted electronically between a user side and a supplier side.

BACKGROUND

FIG. 1 represents a typical arrangement of customers and suppliers engaging in transactions electronically. Various suppliers 3 make their products and services available electronically via supplier servers 3a. Users, or customers, communicate electronically with the suppliers 3 using personal computers 1 or computer terminals 2 (which can also be personal computers) connected as part of a local area network (LAN) 4. These personal computers 1 and computer terminals 2 generally have access to a printing apparatus that will print data when the user requests such printing. In the case of a personal computer 1, the printing apparatus 6 is generally directly connected to the personal computer, while in the case of a computer terminal 2 in a LAN 4, the computer terminal 2 is generally connected to a shared printing apparatus 6a via the LAN 4. Printing only takes place when a user manually requests that data be printed.

Increasingly, customers are purchasing more and more of the products and services they desire through suppliers making their products available through electronic transactions performed in the environment displayed in FIG. 1. These transactions should be recorded and tracked in order to ensure that customers receive the goods and services that they have purchased. Such tracking is commonly accomplished through the generation of confirmation numbers by the suppliers 3 which allow customers to track the status of their purchases and serve as a confirmation that a transaction actually took place. It is desirable necessary to communicate such records generated by the suppliers to users so that users can maintain a record of their electronic transactions.

Several methods are used to communicate this information to users presently. In one method, record information is generated, e-mailed to the user and then manually printed by the user via a manual direction to print the record on a printing apparatus on the user side of the communication. In another method, the record information is printed as result of an instruction on the supplier side of the communication, with the paper copy of the record being mailed to the user subsequently. Alternatively, the transaction record can be transmitted directly to the user as part of the information displayed on the user screen. The information can then be printed by the user using a manual request to print the data on the screen. The common problem shared by all of these methods, is that they are all subject to error when either the user or supplier fails to manually request printing of the transaction information. If no manual request to print is made, the transaction information may be lost and users would be left with no record of their transaction.

SUMMARY

One object of this patent specification is to provide a method of automatically printing transaction information regarding a transaction conducted electronically that is not subject to errors that may occur when a user or a supplier fails to manually request that transaction information be printed.

Another object is to provide a system for automatically printing a hard copy of transaction information relating to a transaction conducted electronically that is free from the above mentioned errors.

Yet another object is to provide a printing apparatus for automatically printing a hard copy of transaction information relating to a transaction conducted electronically free from the previously described problem.

A method of automatically printing a hard copy of transaction information relating to a transaction conducted electronically between a user-side and a supplier-side is provided. First a step of automatically identifying, at the user side, without reliance on user action, a selected aspect of information relating to the electronic transaction and thereby generating a print request is performed. In a second step, the print request is sent to a printing apparatus where, in a third step, the printing apparatus prints information regarding the electronic transaction in response to said print request.

According to a second embodiment, a system for automatically printing a hard copy of transaction information relating to a transaction conducted electronically between a user-side and a supplier-side is provided. The system includes a control apparatus for automatically identifying on a user side, without reliance on user action, a selected aspect of information regarding the electronic transaction and thereby generating a print request. A communication apparatus transmits the print request to a printing apparatus, and the printing apparatus prints information regarding the electronic transaction in response to the print request.

A printing apparatus for automatically printing a hard copy of transaction information relating to a transaction conducted electronically between a user-side and a supplier-side is also provided. The printing apparatus includes a receiver for receiving instructions from a control apparatus, where said control apparatus automatically identifies, without reliance on user action, a selected aspect of information regarding said electronic transaction and thereby generates a print request to be sent to the printing apparatus. The printing apparatus further includes printing means for printing transaction information regarding the electronic transaction in response to the print request received from the from the control apparatus.

DETAILED DESCRIPTION

Figure 2:
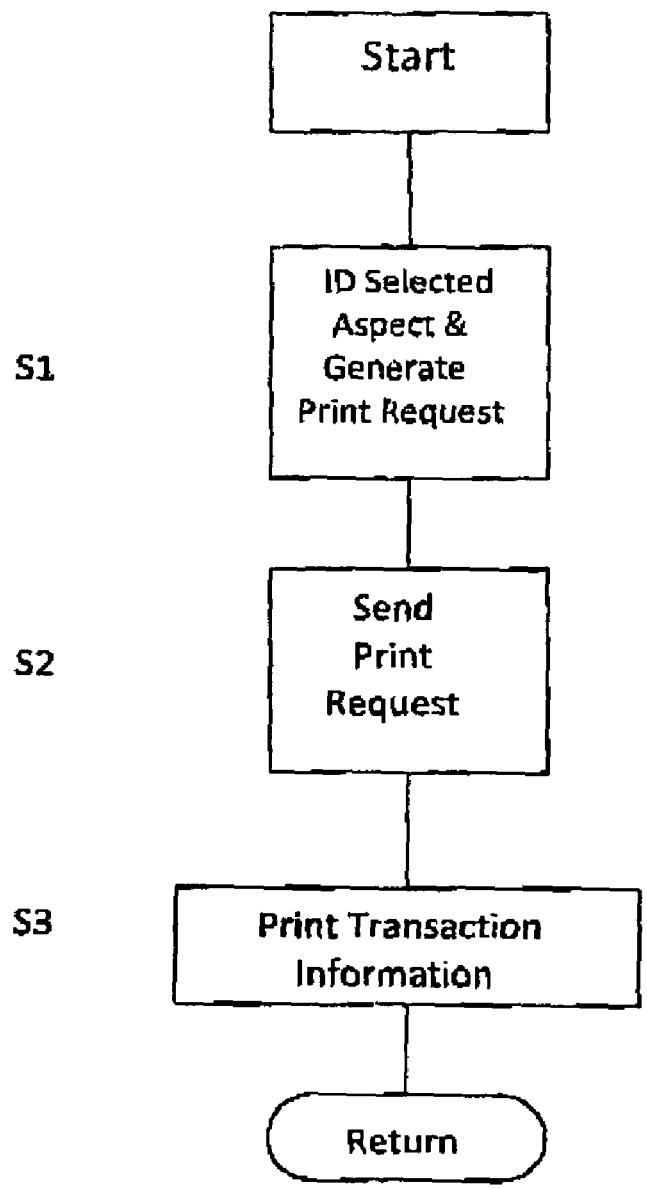
FIG. 2 is a flow chart illustrating one embodiment of a method for automatically printing transaction information regarding a transaction conducted electronically between a user-side and a supplier-side.

A first embodiment provides a method of automatically printing a hard copy of transaction information relating to a transaction conducted electronically between a user-side and a supplier-side and is explained with reference to FIG. 2. At step S1, a selected aspect of information relating to the electronic transaction is identified automatically without reliance on user action, and a print request is automatically generated thereby without requiring a user action seeking printing. The print request is then sent to a printing apparatus 5 at step S2. A hard copy of the transaction information relating to the electronic transaction is then printed by the printing apparatus 5 at step S3. Steps S1-S3 occur automatically without the need for user intervention, and therefore, avoid any complications that may arise when a user fails to request printing of a hard copy of transaction information.

Step S1, automatically identifying a selected aspect of information regarding the electronic transaction and thereby generating a print request, is further explained with reference to FIG. 3. At step SS1 a determination is made as to whether notification of communication between personal computer 1 and a supplier 3 has been conveyed. The supplier 3 maintains or otherwise has access to a server 3a allowing customers to connect electronically to the supplier 3. A customer using a personal computer 1 with a web browser accesses the supplier server 3a of the supplier 3. The customer activates a "submit" function using the web browser to submit the customer's order to the supplier 3. Upon activation of this "submit" function, notification is made of communication between the personal computer 1 and the supplier server 3a. Where no notification has been provided, the process continues to wait for notification. After notification has taken place, the process continues to step SS2 where communication between the personal computer 1, or user, and the supplier 3 or supplier server 3a is monitored. At step SS3, it is determined whether a selected aspect of information relating to the electronic transaction sent as part of the communication is recognized. The selected aspect of information may include but is not limited to, for example, a confirmation number, password, or invoice information. Any indication that transaction information desired by a user of the personal computer 1 should be printed could be used as the selected aspect of information. If no such recognition occurs, monitoring continues. If recognition occurs at step SS3, a print request is generated at step SS4. The print request may serve to request printing of the selected aspect of information itself, or any transaction information regarding the electronic transaction. For example, if the selected aspect of information recognized in step SS3 is indeed a confirmation number, printing the confirmation number itself would be useful. If, however, the selected aspect of information recognized in step SS3 is for example, a standard encoded signal sent by a supplier to indicate that transaction information should be printed, the encoded signal itself need not be printed. In such a case, the print request would request printing of the transaction information only.

While a preferred embodiment of a method for automatically printing a hard copy of transaction information relating to a transaction conducted electronically between a user side and a supplier side is disclosed above, other examples are within the scope of this disclosure. For example, a computer terminal 2 connected as part of a LAN 4 may be substituted for the stand-alone personal computer 1. In such an embodiment, communication between the computer terminal 2 and a supplier 3 or supplier terminal 3a is monitored in order to identify the selected aspect of information. Any print request generated is sent to a printing apparatus 6a connected to the computer terminal 2 via the LAN 4. A step of storing the printed information regarding the electronic transaction in a storage apparatus 9 can be added to the above described method. This results in both a hard and "soft" copy of the desired transaction information being automatically generated.

Figure 4:
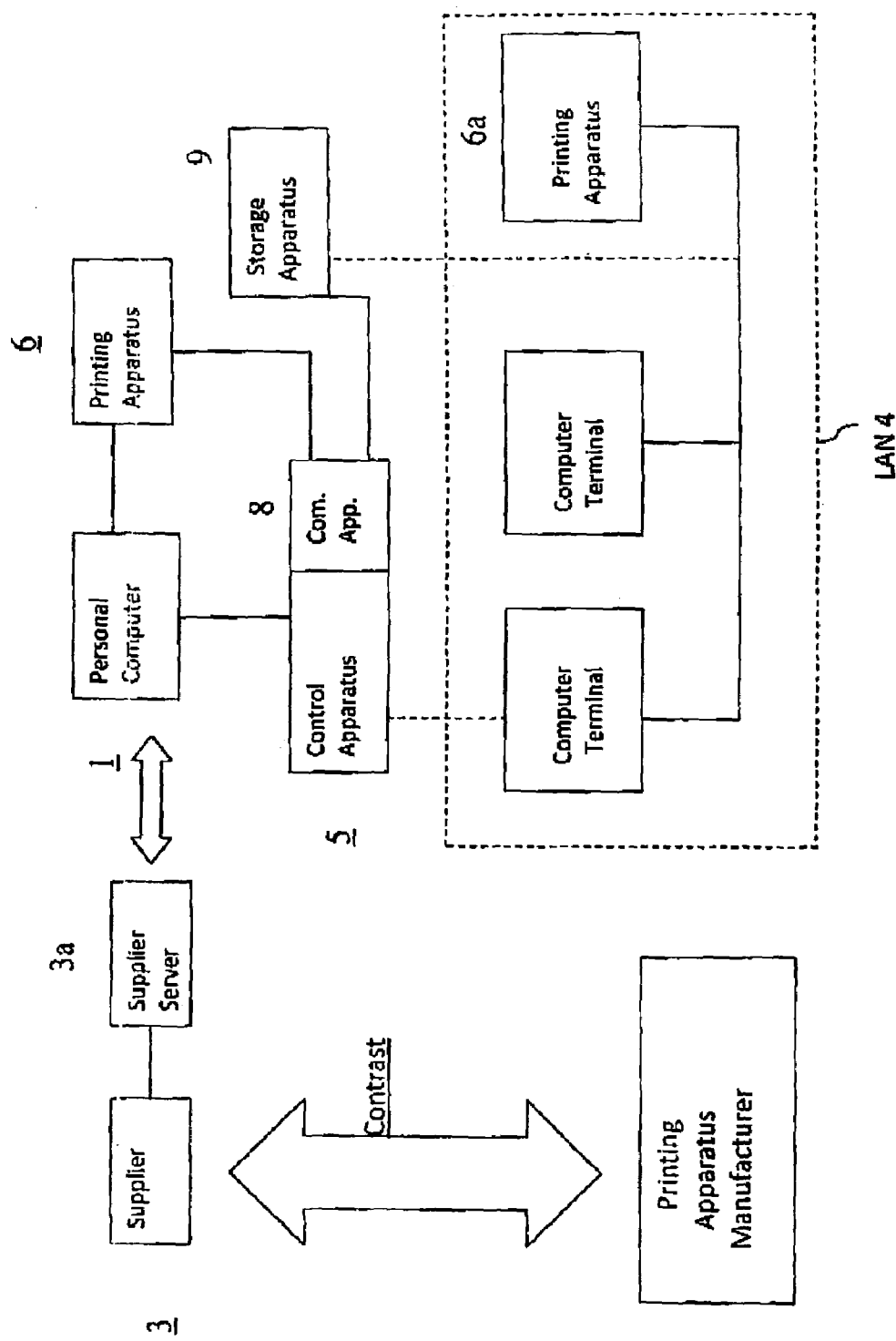
FIG. 4 is a block diagram of a system for automatically printing a hard copy of transaction information regarding a transaction conducted electronically between a user-side and a supplier-side.

FIG. 4 demonstrates a general configuration of a system for automatically printing a hard copy of transaction information regarding a transaction conducted electronically between a user side and a supplier side.

A user uses a personal computer 1 to establish communication with a supplier 3 or supplier terminal 3a electronically. Control apparatus 5 monitors communications between the user and supplier and attempts to automatically identify, without relying on user action, a selected aspect of information relating to the electronic transaction and thereby generate a print request. The control apparatus 5 then sends the print request to the printing apparatus 6 via a communication apparatus. The printing apparatus 6 prints transaction information regarding the electronic transaction. Using the above system, transaction records are printed without user intervention whenever an electronic transaction is made. Hence, the problems associated with user or supplier failure to request printing of transaction records are avoided.

In order to facilitate interaction between the control unit 5, printing apparatus 6 and communication with suppliers 3 it may be useful for printing apparatus manufacturers and the suppliers 3 to establish a contractual relationship as indicated in FIG. 4. In this manner, the selected aspect of transaction information to be automatically identified so that a print request may be generated can be mutually agreed upon or standardized.

Figure 5:
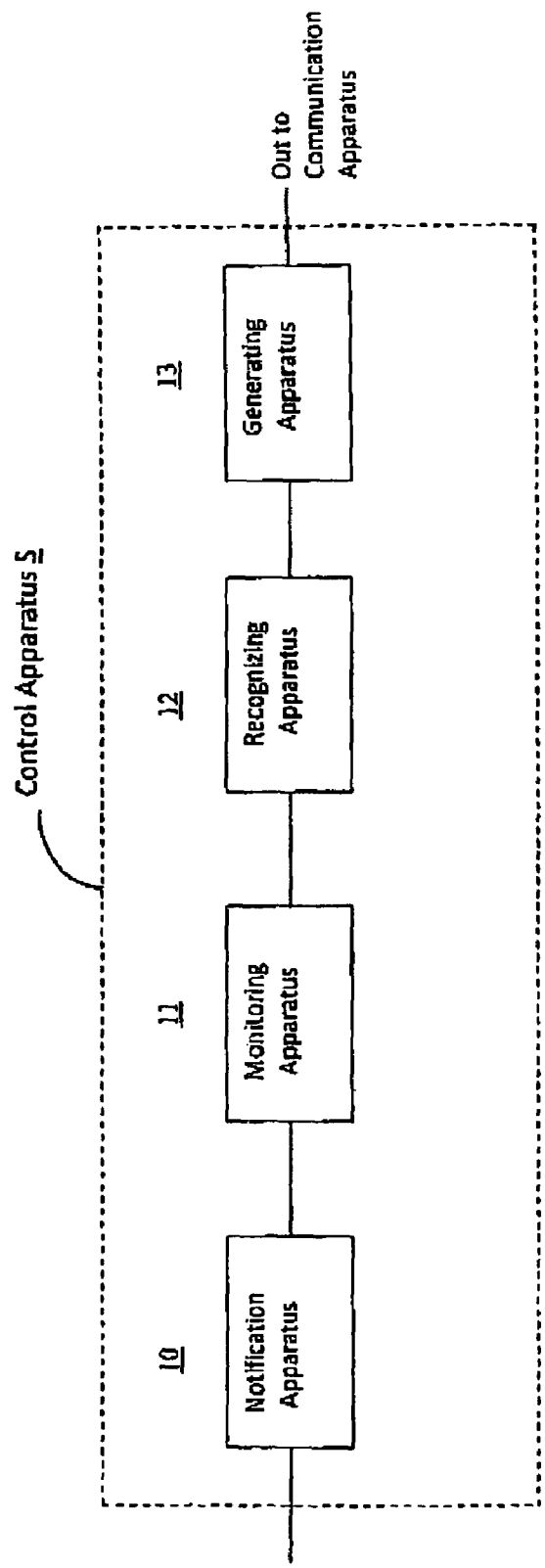
FIG. 5 is a block diagram demonstrating construction of a control apparatus included as part of the system displayed in FIG. 4.

FIG. 5 represents a block diagram of the control apparatus 5 included in FIG. 4. Notification apparatus 10 is notified that communication is occurring between the personal computer 1 and a supplier 3. Notification apparatus 10 is connected between a customer using personal computer 1 and the server 3a of the supplier 3. When the submit function of the web browser on the personal computer 1 is activated as described above, the notification apparatus 10 identifies and receives a "post" command sent from the personal computer 1 to the server of the supplier 3a indicating posting of the customer's order to the supplier 3 and providing notification of communication between supplier and customer. The notification apparatus 10 can then cache the html data sent by the supplier server 3a of the supplier 3 to the personal computer 1 of the customer. Upon notification, monitoring apparatus 11 monitors the communication including the data cached in the notification apparatus and recognizing apparatus 12 recognizes a selected aspect of information relating to the electronic transaction. Only when such recognition occurs, does generating apparatus 13 generate a print request. The control apparatus operates without a need for user intervention, and therefore produces a print request whenever a selected aspect of information is identified regardless of whether a user manually makes such a print request.

The selected aspect of information regarding the electronic transaction may include, but is not limited to, for example a confirmation number, password, or invoice information. The selected aspect of information identified by the control apparatus 5 need not itself be printed. Where the selected aspect of information is, for example, a confirmation number, it would be desirable to create a hard copy of the confirmation number. However, any data or signal that can be recognized and indicates that desired transaction information should be printed can be used as the selected aspect of information recognized by the control apparatus 5. Where the selected aspect of information is, for example, merely a standard encoded signal used by the supplier to indicate that desired transaction information should be printed, there is no need to print the actual encoded signal, only the desired information.

Figure 3:
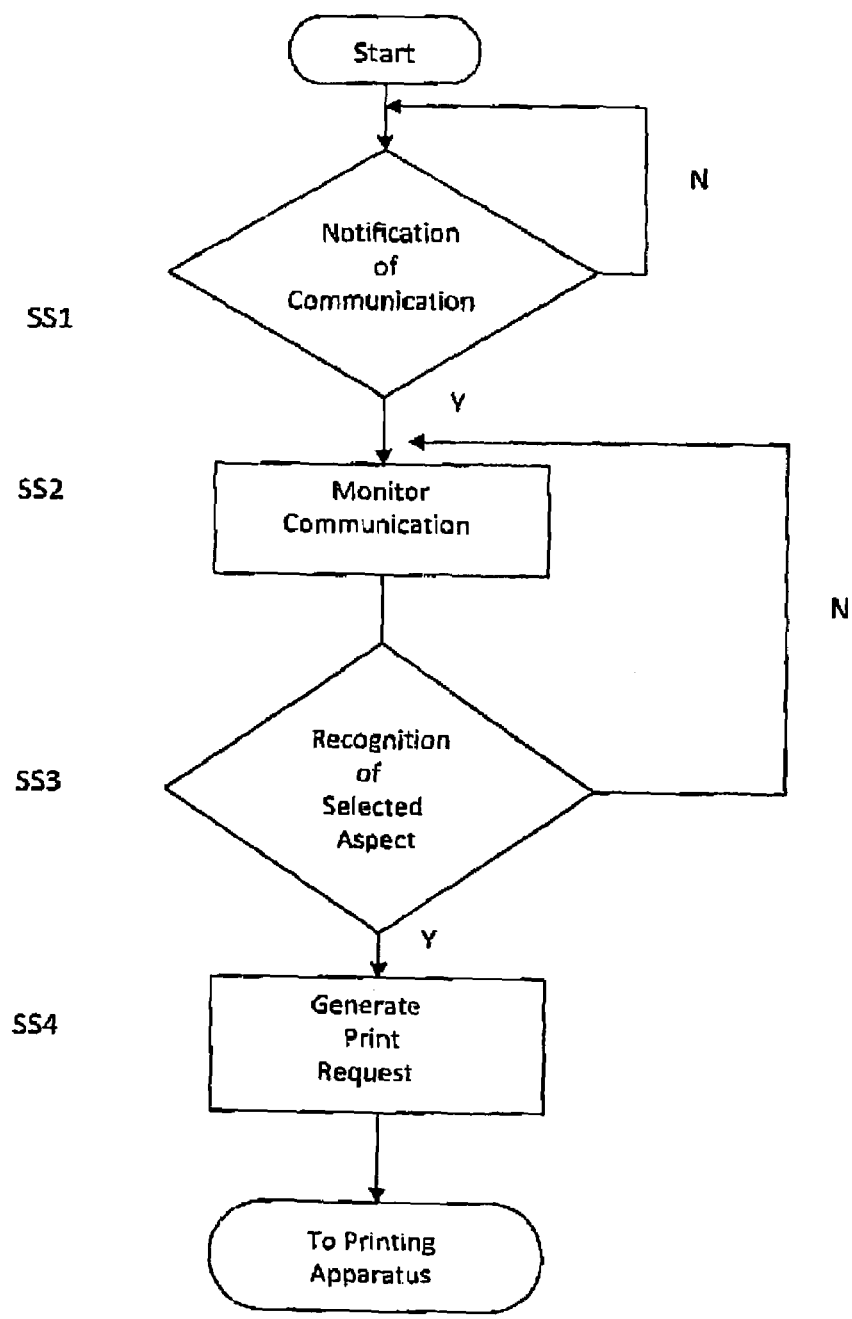
FIG. 3 is a flow chart illustrating operation of step S1 in FIG. 2.
Figure 6:
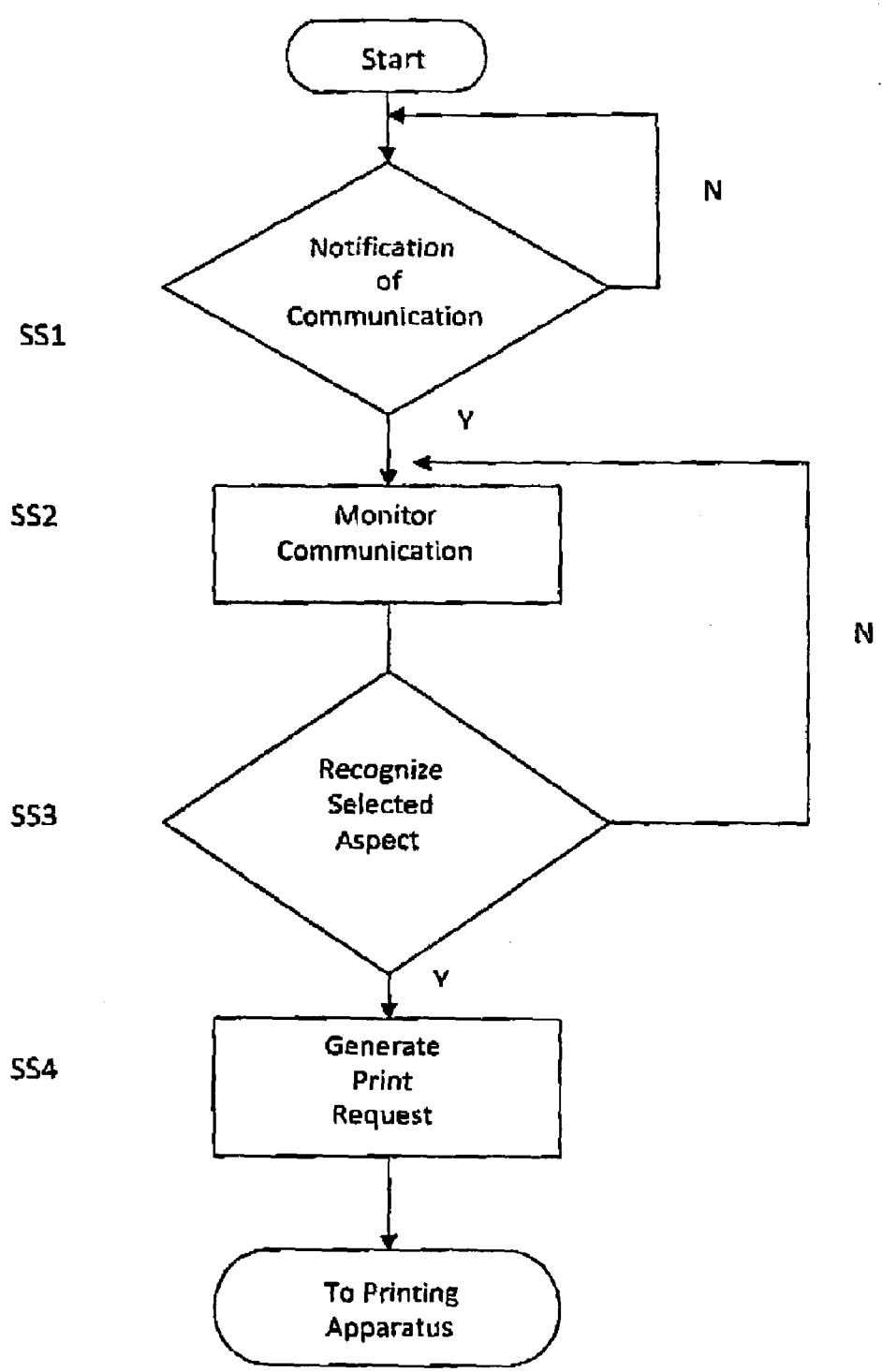
FIG. 6 is a flow chart demonstrating operation of the control apparatus of FIG. 5.

FIG. 6 is a flow chart representing an operation of the control apparatus 5 which is substantially that of the identifying step S1 as described in FIG. 3 and therefore, the description of that operation will not be repeated.

The preferred embodiment of a system for automatically printing a hard copy of transaction information relating to a transaction conducted electronically between a user-side and a supplier-side has been described above, but the disclosure is not limited to this embodiment. The personal computer 1 may be replaced by a computer terminal 2 serving as part of a LAN 4. In such a case, the printing apparatus 6a is connected to the computer terminal 2 via the LAN 4. In addition, the control unit 5 can monitor communications between the computer terminal 5 and the supplier 3 via the LAN 4 and sends the print request to printing apparatus 6a via the LAN 4. Another embodiment of an automatic printing system includes a storage apparatus 9 in which the transaction information to be printed can also be stored. In such an embodiment, both a hard and "soft" copy the transaction information are automatically generated without need for user interaction. The storage apparatus can be directly connected to the personal computer 1 or connected to the computer terminal 2 via the LAN 4.

Figure 7:
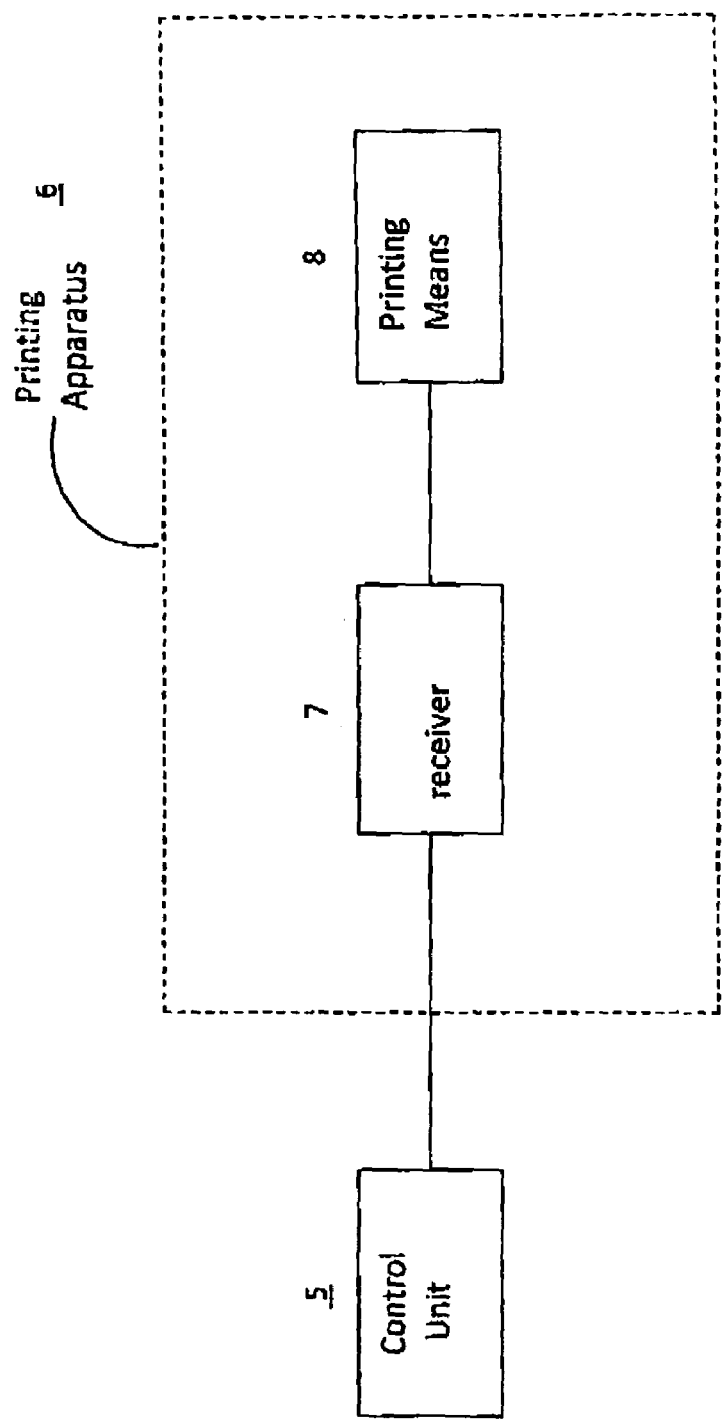
FIG. 7 is a block diagram demonstrating construction of a printing apparatus for automatically printing a hard copy of transaction information regarding a transaction conducted electronically between a user-side and a supplier-side.

FIG. 7 is a block diagram representative of a printing apparatus for automatically printing a hard copy of transaction information relating to a transaction conducted electronically between a user side and a supplier side according to one embodiment of the present invention. The printing apparatus is of the type likely to be used in the above described system for automatically printing a hard copy of transaction information. The printing apparatus includes a receiver 7 for receiving directions from a control apparatus 5 and printing means 8. Control apparatus 5, automatically identifies without reliance on user action, a selected aspect of information regarding the electronic transaction and thereby generates a print request to be sent to the printing apparatus 6 and received by the receiver 7. The printing apparatus then prints information regarding the electronic transaction using printing means 8.

Control apparatus 5 is analogous to the control apparatus shown in FIG. 5 and operates according to the method described in FIG. 3. Therefore, the description of the construction and operation of control apparatus 5 of the printing apparatus will not be repeated.

Figure 1:
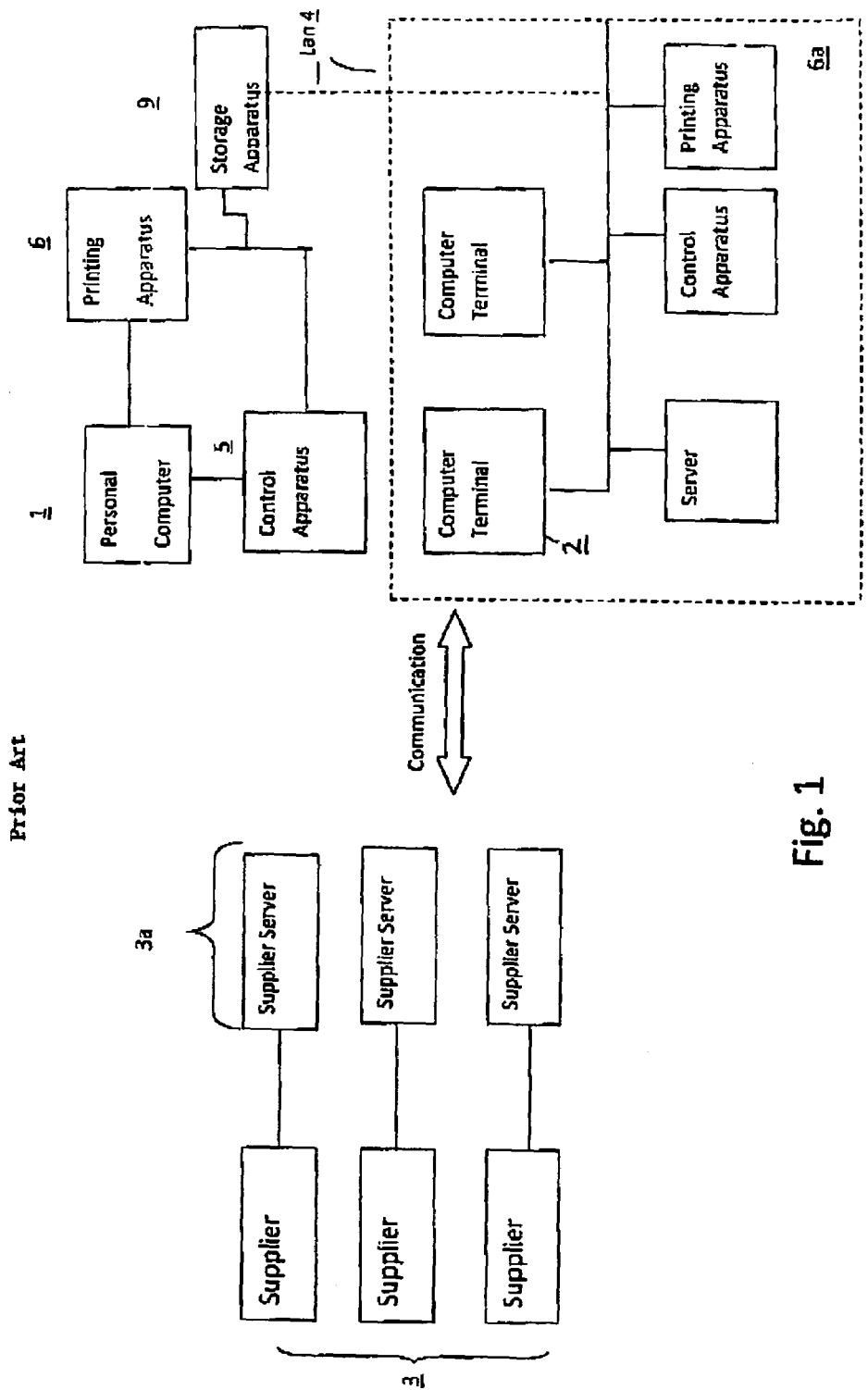
FIG. 1 is a representation of an environment in which electronic transactions occur.

In an alternative embodiment, the user can use a computer terminal 2 connected as part of a LAN 4 to communicate with the suppliers 3. In such an embodiment, the print request from the control apparatus is sent from the control apparatus 5 to the printing apparatus via the LAN 4. The printing apparatus is represented by printing apparatus 6a in FIG. 1, but can have the same construction and operation as described above. A difference would be that directions from the control apparatus 5 received by the receiver 7 would be communicated via the LAN 4 rather than a direct connection.

Several embodiments have been described above, however, it should be clear to one skilled in the art that variations encompassed by the appended claims are possible and such variations are intended to be included in the scope and spirit of this invention.

The invention claimed is:

1. A method for automatically printing a hard copy of transaction information, said method comprising:
   (a) communicating electronically with a supplier-side computer via the Internet from a user side through a web browser at a user-side computer to conduct an electronic commerce transaction;
   (b) monitoring the electronic communication conducted via the Internet in (a), to identify automatically a selected aspect of information regarding the electronic commerce transaction, including at least one of a confirmation number, password and invoice information;
   (c) extracting electronic commerce information from the electronic communication conducted via the Internet in (a), and automatically generating, without a need for user action specifying, a print request including the extracted electronic commerce information; and
   (d) automatically sending said print request to a user-side printing apparatus, the user-side printing apparatus prints the print job including the electronic commerce information extracted from the electronic communication conducted via the Internet in (a).

2. The method of claim 1, wherein said monitoring in (b) is performed at the user-side.

3. The method of claim 1, wherein the automatic generation of the print request in (c) is performed at the user-side.

4. The method of claim 1, wherein the extraction in (c) of the electronic commerce information from the electronic communication is performed at the user-side.

5. The method of claim 1 further comprising:
   storing said extracted electronic commerce information in a storage medium.

6. The method of claim 1, wherein said electronic commerce information included in the print job includes said selected aspect of information regarding the electronic commerce transaction.

7. A method for automatically printing a hard copy of transaction information, said method comprising:
   (a) communicating electronically with a supplier-side computer via the Internet from a user side through a web browser at a user-side computer to conduct an electronic commerce transaction:
   (b) monitoring the electronic communication conducted via the Interact in (a), to identify automatically a selected aspect of information regarding the electronic commerce transaction, including at least one of a confirmation number, password and invoice information;
   (c) extracting electronic commerce information from the electronic communication conducted via the Interact in (a), and automatically generating, without a need for user action specifying, a print request including the extracted electronic commerce information; and
   (d) automatically sending said print request via a local area network to a user-side printing apparatus, the user-side printing apparatus prints the print job including the electronic commerce information extracted from the electronic communication conducted via the Interact in (a).

8. The method of claim 7, wherein said selected aspect of information regarding the electronic commerce transaction includes a password.

9. The method of claim 7, wherein said selected aspect of information regarding the electronic commerce transaction includes invoice information.

10. The method of claim 7, wherein said selected aspect of information regarding the electronic commerce transaction includes a confirmation number.

11. The method of claim 10, wherein said electronic commerce information included in the print job includes said confirmation number.

12. The method of claim 7, wherein said selected aspect of information regarding the electronic commerce transaction is set by contract.

13. The method of claim 7, wherein said selected aspect of information regarding the electronic commerce transaction is set by a standard.

14. The method of claim 7, wherein said selected aspect of information regarding the electronic commerce transaction is communicated by the supplier-side computer to the user-side computer.

15. The method of claim 7, wherein said monitoring in (b) is performed by a control apparatus on the user side, and said control apparatus sends said print request in (d), and wherein said control apparatus performs (b) and (d) without user intervention.

16. The method of claim 7, wherein said selected aspect of information regarding the electronic commerce transaction includes a print command from the supplier-side computer to the user-side computer.

* * * * *